H. W. BARROWS.
VALVE.
APPLICATION FILED JUNE 19, 1917.

1,291,723.

Patented Jan. 21, 1919.
2 SHEETS—SHEET 1.

WITNESSES
Jas. K. McCathran
F. T. Chapman

INVENTOR
H. W. Barrows
BY
C. G. Biggers
ATTORNEY

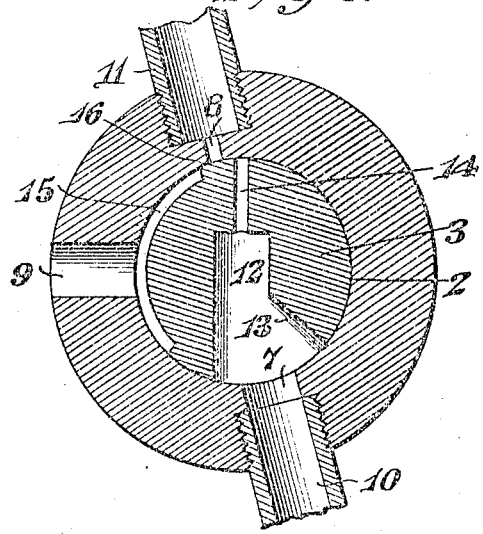
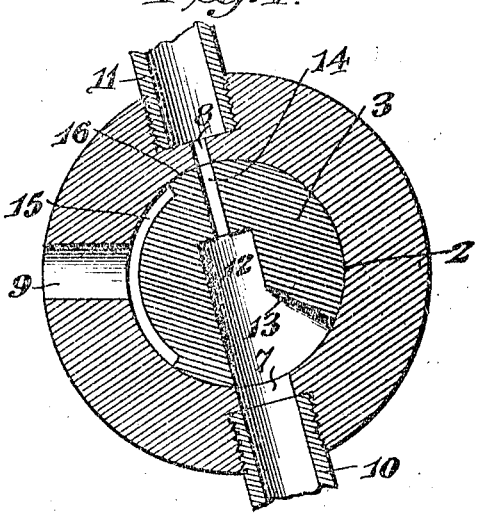
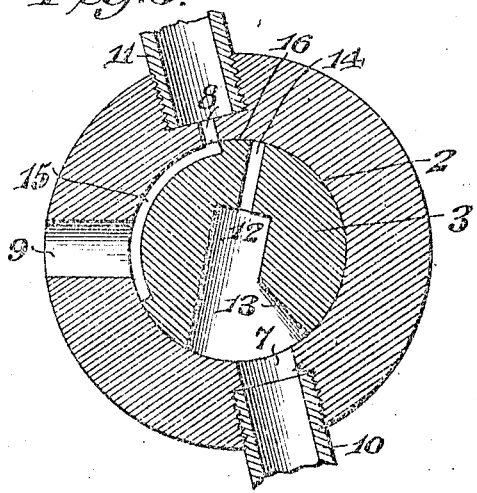
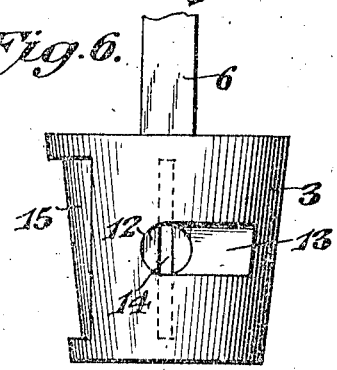
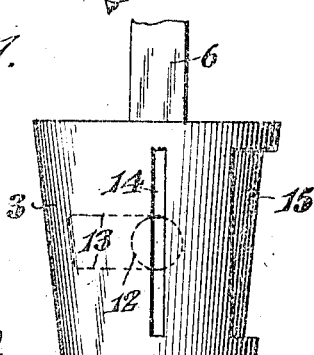
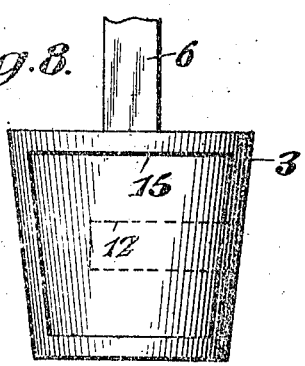

UNITED STATES PATENT OFFICE.

HARRY W. BARROWS, OF OMAHA, NEBRASKA.

VALVE.

1,291,723.

Specification of Letters Patent.  Patented Jan. 21, 1919.

Application filed June 19, 1917. Serial No. 175,716.

*To all whom it may concern:*

Be it known that I, HARRY W. BARROWS, a citizen of the United States, residing at Omaha, in the county of Douglas and State of Nebraska, have invented a new and useful Valve, of which the following is a specification.

This invention has reference to valves designed particularly for, but not necessarily restricted to, vacuum brake systems for automobiles.

The object of the invention is to provide a valve structure for interposition between the intake manifold of an explosion engine, such as is employed on an automobile, and a brake system in which atmospheric pressure is employed to cause the braking action.

In accordance with the invention, the valve comprises a valve casing and a valve plug or rockable member, with means whereby the valve plug may be rocked sufficiently to cause ports to be brought into communication to connect the brake mechanism with the intake manifold of an explosion engine, whereby vacuum conditions are established through the valve, after which the valve plug is moved into a position to maintain such vacuum conditions, or the valve plug is moved to a position where the brake mechanism is placed into communication with the atmosphere to break the vacuum.

The invention will be best understood from a consideration of the following detailed description, taken in connection with the accompanying drawings forming part of this specification, with the further understanding that, while the drawings show a practical form of the invention, the latter is not confined to any strict conformity with the showing of the drawings, but may be changed and modified so long as such changes and modifications come within the scope of the appended claims.

Fig. 3 is a section on a plane about midway of the height of the valve as shown in Fig. 2, and illustrating the valve plug in the neutral position.

Fig. 4 is a view similar to Fig. 3, but showing the valve plug in position for applying the brakes.

Fig. 5 is a view similar to Figs. 3 and 4, but showing the valve plug in a position to release the brakes.

Fig. 6 is an elevation of the valve plug as viewed from that side toward the pipe leading from the intake manifold.

Fig. 7 is a view similar to Fig. 6 but of that side of the plug remote from the side shown in Fig. 6.

Fig. 8 is an elevation of the plug as seen from the right hand side of Fig. 7.

Figure 1:
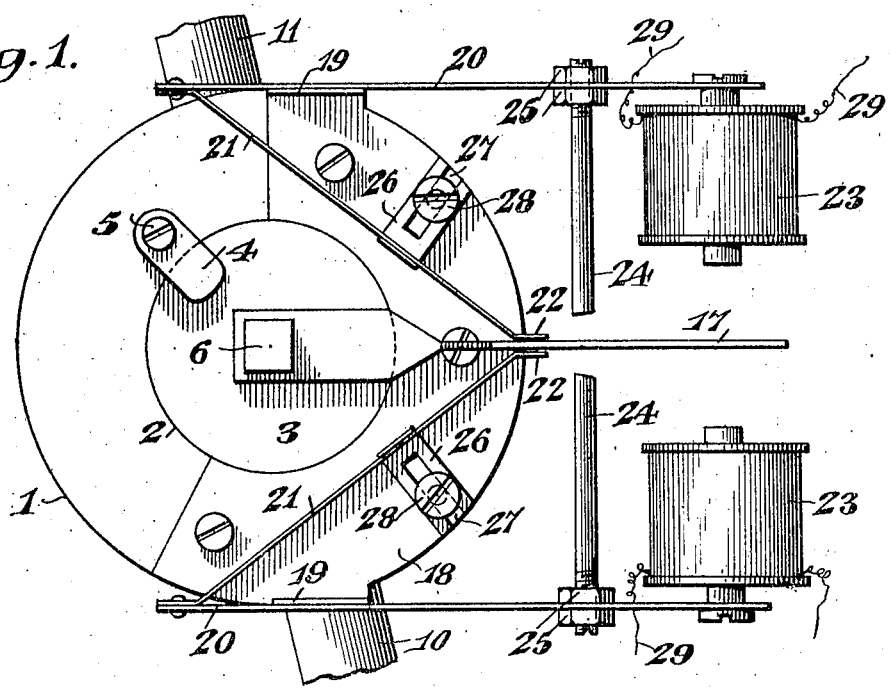
Figure 1 is a plan view of a valve embodying the invention and arranged for actuation by electrical mechanism.

Referring to the drawings there is shown a valve casing 1, which, in the particular construction illustrated, is cylindrical, although of course it may be of any desired shape suitable for the purpose. Axially through the casing 1, there is a passage 2 in which is seated a valve plug 3, the latter being shown in the drawings as of the customary taper or spigot form, but it will be understood that any suitable form of valve plug may be employed. Of course, if the valve plug 3 be of taper form the passage 2 is of like form and, in order to insure a proper fit it is customary to grind the plug into suitable seating relation to the casing. To retain the plug in its seat in the casing there is provided a clip 4 made fast to the casing by a screw 5, or otherwise, and engaging over the larger end of the plug. For convenience of description it will be assumed that the valve casing is upright and the large end of the valve plug is the upper end of the plug.

Rising from the top of the valve plug is a valve stem 6 shown in the drawings as of square cross section, but it will be understood that any other suitable cross sectional shape may be provided.

Extending through the valve casing from the exterior to the interior thereof are ports 7, 8 and 9, respectively. The port 7 is shown as a round port and is countersunk at the outer end and suitably tapped for the reception of the threaded end of a pipe 10. The port 8, where it enters the passage 2 within the casing, is narrow circumferentially of the casing but is extended up and down for a purpose to be described.

Where the port 8 leaves the casing it is round, like the port 7, and is suitably counterbored and tapped to receive the threaded end of a pipe 11, which latter may be considered as leading to a suitable brake mechanism of a character responsive to atmospheric pressure.

The port 9 may be a simple round port opening into the passage 2 at its inner end and freely open to the atmosphere at its outer end, although it will be understood that this does not preclude the provision of means for protecting the port 9 from the entrance of deleterious matter.

The valve plug 3 has a diametric passage or port 12 formed in one side, which port may be of a size corresponding to that of the port 7. The port 12 has a side offset or enlargement 13 extending for a short distance circumferentially of the plug 3. Continuing across the plug from what constitutes the inner end of the passage or port 12 is another passage or port 14 widening up and down as it approaches the peripheral portion of the plug until it extends from near the top of the plug to near the bottom thereof, where it has an up and down spread corresponding to that of the port 8.

In the operation of the device it is desirable that the plug should oscillate about its longitudinal axis through but a minimum distance to bring the ports 8 and 14 into and out of coincidence, and for this reason the circumferential extent of both the passage 14 and the port 8 is made small. By this means the extent of oscillatory movement need only be a litle more than the width of the port 8 and much less than the diameter of a cylindrical port of the same area. The side offset 13 of the port or passage 12 is shown as of substantially the same height as said passage 12 and the circumferential length of the extension 13 is such that the port 7 is at all times in communication with the passage 12 and offset 13 over the full area of the port 7.

At a part of the peripheral portion of the plug 3 corresponding in position to port 9, there is provided another port in the form of a shallow isolated recess 15 of a height corresponding to the port 8 where it enters the passage 2 and of a circumferential extent sufficient to bridge the space between the ports 8 and 9 and to permit the desired oscillation of the valve plug without at any time closing any part of the port 9. The effective area of the recess 15, which serves solely as a peripherally located bridging port, is always equal to or greater than that of a port 9.

The port or passage 14 and the recess 15 are spaced apart by a plane surface or plateau 16 of sufficient area to cover the port 8, so that the port will then be out of communication with either the port 14 or the recess 15 arranged on respectively opposite sides of the plateau 16.

The port arrangement of the valve is such that when the plateau 16 is in covering relation to the port 8 the valve is closed so far as connection with the brake pipe 11 is concerned.

If it be considered that the engine has its intake manifold connected with the pipe 10 and is running, then there is produced in the pipe 10 a practically constant subatmospheric pressure due to the suction of the engine. Such subatmospheric pressure may be, for the purpose of the invention, described as a vacuum.

When the valve plug 3 is turned, as shown in Fig. 4, to an extent to bring the port 14 into coincidence with the port 8 then there is a tendency to create vacuum conditions within the pipe 11 because of the suction constantly present in the pipe 10, the two pipes 10 and 11 being then in communication through the valve. The result is that the brakes are applied because of the vacuum conditions produced in the pipe 11. As soon as the desired brake conditions are established, the valve plug 3, is moved to the position shown in Fig. 3, thereby cutting off further communication with the pipe 11. This maintains the application of the brakes for as long a time as may be desired.

When it is necessary to release the brakes the valve plug 3 is turned to the position shown in Fig. 5 where the recess 15, always in communication with the port 9, is moved into communication with port 8, whereupon normal atmospheric pressure is established in the pipe 11 by the inrush of air through the port 9. Finally the valve plug may be once more returned to the position shown in Fig. 3 ready for a subsequent application of the brakes by means of the operations already described.

The peculiar shapes of the ports in the valve casing and valve plug permit the various conditions to be established by a minimum movement of the valve plug, without, however, any throttling of any of the passages through which air is exhausted or through which it travels, wherefore the action of the valve, in so far as the movement of air through it is concerned, is rapid.

The valve stem 6 may be utilized for operating the valve by hand but in the case of an automobile and under other working conditions it is often desirable that the valve be operated by a distant control. Since it is very common in automobiles to have electric current available, electric control offers a convenient means for distant operation of the valve.

Figure 2:
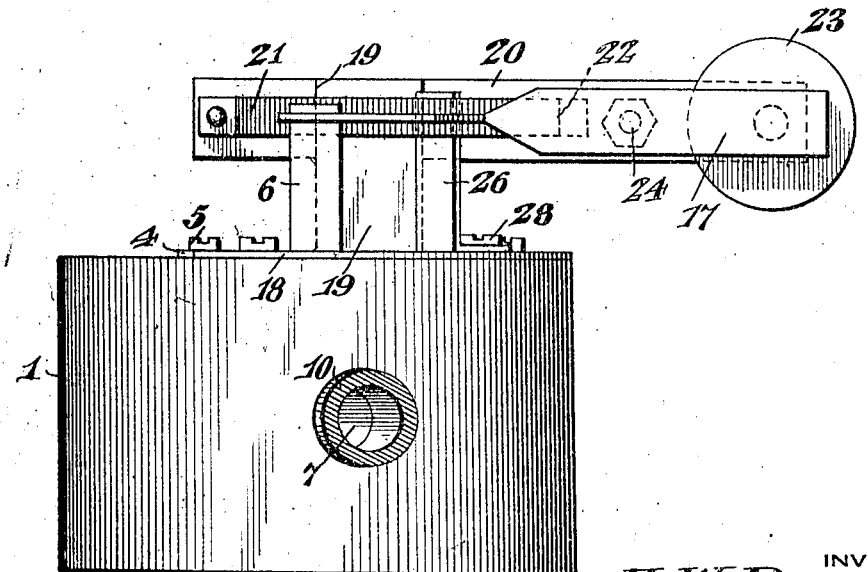
Fig. 2 is an elevation of the structure shown in Fig. 1 and showing, in section, the pipe for connecting the valve to the intake manifold of an explosion engine.

A convenient form of electric control is illustrated in Figs. 1 and 2. Fast to the valve stem 6 is an armature lever 17. Fast to the top of the casing 1 is a plate 18 which, on opposite sides of the casing, has upright portions 19 each carrying an arm 20. At one end of each arm 20, near the upright 19, there is secured one end of a spring strip 21 the other end 22 of which is brought into close relation to the corresponding side of the armature lever 17. The spring strips 21 are so arranged as to serve as centralizing means for the armature lever 17 and through the latter for the valve plug 3, tending to hold the plug in the inactive or neutral position shown in Fig. 3.

At the end of each arm 20 remote from the end to which the spring 21 is secured, there is mounted an electromagnet 23 directed toward and in operative relation to the armature lever 17 at the end of the latter remote from the post 6. Each arm 20 also carries a stop pin 24 extending through the arm and there threaded and having lock nuts 25 applied to it on opposite sides of the arm so that each pin 24 may be adjusted as desired.

Brackets 26 are arranged in the paths of the springs 21, preventing them from approaching toward the stem 6 beyond a predetermined distance. The brackets 26 have longitudinal slots as shown at 27 and are held in adjusted positions on the plate 18 by screws 28, or other suitable fastening means, extending through the slots 27.

The magnets 23 are connected by electric conductors to any suitable source of current such as is customarily present upon automobiles, and also to any suitable switching or other controlling means, whereby an operator may cause the energization of the magnets 23 at will to rock the valve plug 3 in one direction or the other, as needed, to apply or release the brakes in the manner already described.

What is claimed is:—

1. A valve structure comprising a casing and a rockable valve plug therein, the casing having a plurality of ports, and the plug having a plurality of ports for communicating with the ports of the casing, opposite ports in the valve plug being elongated one in the direction of the length of the axis of rocking of the plug and the other elongated circumferentially of the plug, and another port in the plug isolated from the first named ports in the plug and in the form of a recess in the surface of the plug and elongated both axially and circumferentially of said plug.

2. A valve structure comprising a casing and a rockable valve plug mounted therein, the valve casing having oppositely located ports and another port intermediate of the first-named ports, and a plug having a passage therethrough matching the oppositely located ports, and a circumferentially and axially elongated recess in one side for connecting the third-named port of the casing with one of the first-named ports thereof, and the port through the plug being circumferentially elongated at one end and axially elongated at the other end, with the port in the casing associated with the last-named end of the port through the valve plug correspondingly axially elongated.

3. A valve structure comprising a casing and a valve plug therein, the plug having a through port extended at one end circumferentially of the plug and at the other end extended lengthwise of the plug and narrower circumferentially of the plug than lengthwise thereof, the casing having a narrow extended port matching the similarly shaped port in the plug.

4. A valve structure comprising a casing and a valve plug therein, the plug having a through port extended at one end circumferentially of the plug and at the other end extended lengthwise of the plug and narrower circumferentially of the plug than lengthwise thereof, the casing having a narrow extended port matching the similarly shaped port in the plug and said plug also having in one side a shallow longitudinally and circumferentially extended recess.

5. A valve structure comprising a ported casing, a ported valve plug mounted in the casing for rocking movements, an armature lever connected to the valve plug, centralizing means for the valve plug, electro-magnets mounted in operative relation to the armature lever, stop means for the armature lever and stop means for the centralizing means to limit the action of the latter.

6. A valve structure comprising a valve casing, a rockable valve plug therein, an armature lever connected to the valve, electro-magnets in operative relation to the armature lever on opposite sides thereof, centralizing springs for the armature lever, stop members in the path of the armature lever for limiting its movements toward the electro-magnets, and stop means in the path of the springs for limiting their action on the armature lever.

In testimony that I claim the foregoing as my own, I have hereto affixed my signature in the presence of two witnesses.

HARRY W. BARROWS.

Witnesses:
 HARRY R. PEERY,
 J. H. OSBORNE.